United States Patent [19]
Hanten et al.

[11] Patent Number: 5,743,792
[45] Date of Patent: Apr. 28, 1998

[54] PROCESS OF PRODUCING SAUSAGES

[75] Inventors: Jürgen Hanten, Rockenberg; Günter Vermehren, Usingen, both of Germany

[73] Assignee: Poly-Clip System GmbH & Co. KG., Frankfurt, Germany

[21] Appl. No.: 653,530

[22] Filed: May 24, 1996

[30] Foreign Application Priority Data

May 26, 1995 [DE] Germany ............ 195 19 394.6

[51] Int. Cl.$^6$ .................................. A22C 11/00
[52] U.S. Cl. ................. 452/37; 452/29; 452/48; 452/31
[58] Field of Search .................. 452/37, 30, 29, 452/46, 48, 49, 31

[56] References Cited

U.S. PATENT DOCUMENTS

| | | | |
|---|---|---|---|
| 4,322,871 | 4/1982 | Townsend et al. | 452/31 |
| 4,370,779 | 2/1983 | Meier | 452/35 |
| 4,602,402 | 7/1986 | Schnell | 452/37 |
| 4,766,645 | 8/1988 | Lamartino et al. | 452/37 |
| 4,847,951 | 7/1989 | Kollross | 452/30 |
| 5,083,970 | 1/1992 | Reutter | 452/30 |
| 5,573,454 | 11/1996 | Fox et al. | 452/29 |

FOREIGN PATENT DOCUMENTS 3608983  10/1987  Germany ........................ 452/31

Primary Examiner—Willis Little
Attorney, Agent, or Firm—Sprung Kramer Schaefer & Briscoe

[57] ABSTRACT

This invention relates to a process of producing sausages, wherein a tubular sausage casing closed at one end and provided with a figurative print is filled with sausage meat by pressing the sausage meat through the open end of the sausage casing into the same, where the sausage casing is carried along against the resistance of a casing brake and, corresponding to markers on the sausage casing, filled partial lengths of the sausage casing are divided off by compressing and closing them and are subsequently cut off from the remaining sausage casing, which process is characterized in that each filled partial length (sausage) is weighed after having been cut off, and the weight difference between a predetermined desired weight and the actual weight of the partial length is determined, and that the braking force of the casing brake is increased when the actual weight of the filled partial length is smaller than its desired weight, but is decreased when the actual weight is larger than the desired weight, until the actual weight and the desired weight correspond with each other. The invention furthermore consists in an apparatus for producing sausages by means of a sausage casing bearing a figurative print, in particular for carrying out the inventive process, comprising a filling tube and a casing brake as well as means for closing and cutting off filled partial lengths of the sausage casing (sausages), where the apparatus has a balance for individual sausages and an evaluation unit, and where the braking force of the casing brake can be set by means of a setting unit, and the balance is connected with the setting unit via the evaluation unit.

5 Claims, 1 Drawing Sheet

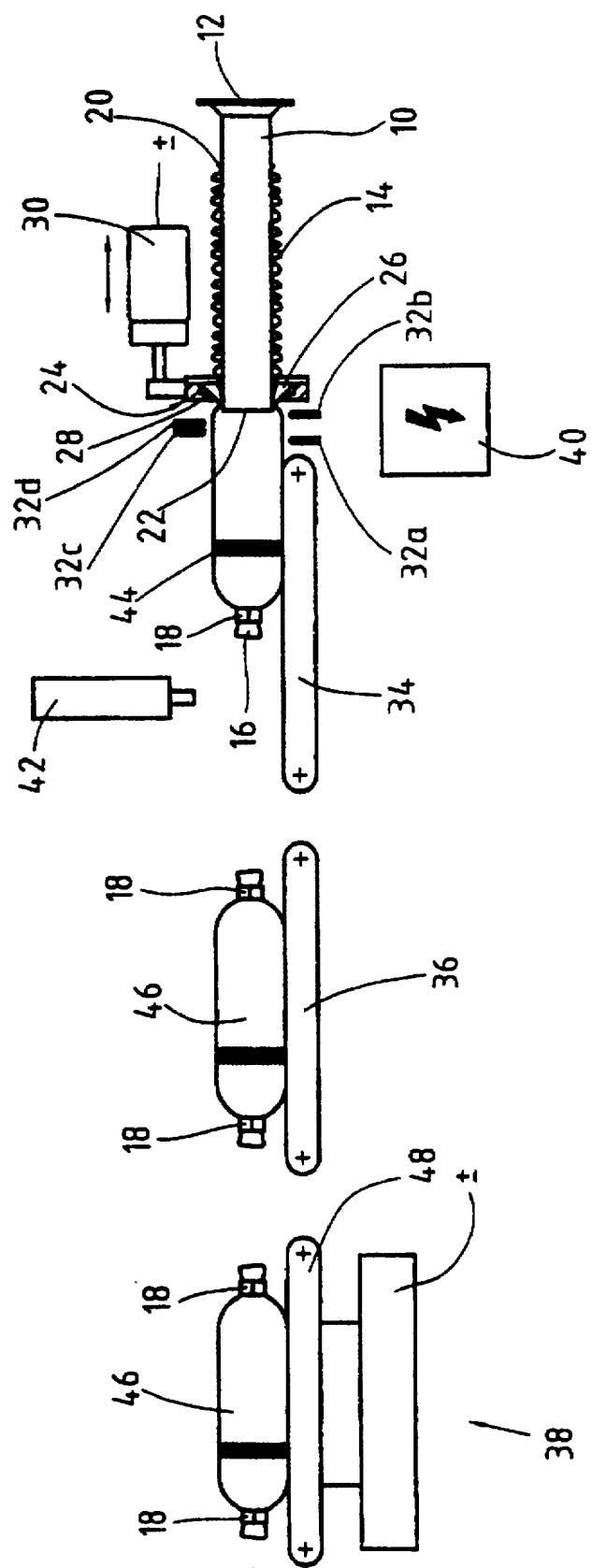

PROCESS OF PRODUCING SAUSAGES

This invention relates to a process of producing sausages, wherein a tubular sausauge casing closed at one end and provided with a figurative print is filled with sausage meat by pressing the sausage meat through the open end of the sausage casing into the same, where the sausage casing is carried along against the resistance of a casing brake and, corresponding to markers on the sausage casing, filled partial lengths of the sausage casing are divided off by compressing and closing the same and are subsequently cut off from the remaining sausage casing. The invention furthermore relates to an apparatus, in particular for carrying out said process, comprising a filling tube and a casing brake as well as means for closing and cutting off filled partial lengths of the sausage casing (sausages).

One type of sausage is characterized by figurative prints applied onto the casing of the sausage. Nowadays, such sausages provided with a figurative print are exclusively produced by using individual tubular sections closed at their ends and possibly provided with a suspension loop, which tubular sections are filled and closed individually. However, such production process is very time-consuming. For producing other types of sausage there are also known continuous production processes for high production rates. But for the reasons stated below, such processes are not suited for the production of sausages with a figurative print.

In the continuous production processes sausage meat is pressed from a filling tube into a tubular sausage casing closed at its front end, the contents of said sausage casing being stored in the filling tube. During the filling operation, the sausage casing runs off from the filling tube through a casing brake, until the amount of sausage meat sufficient for a sausage has been filled into the sausage casing. The filling operation is then interrupted, the filled partial length of the sausage casing is divided off—for instance by gathering the same and setting two clips—, and is then cut off from the remaining sausage casing between the two clips. Thereupon, a new partial length of the sausage casing is filled in the same way. The weight desired for the individual sausage is ensured in that the filling machine interrupts the filling operation and initiates the dividing and cutting, whenever a certain volume—for instance the previously set chamber volume of a piston pump—, has been filled into the sausage casing. When using a piston pump, the filling operation on the one hand, and the operation of dividing and cutting on the other hand, are effected in synchronism with the stroke of the piston.

Although such process provides for higher production rates, and due to the always constant filling volume leads to sausages of a precise weight, it is not suited for the production of sausages with a figurative print: The sausage casing must be provided with the figurative prints before the filling operation, which figurative prints might be provided on the sausage casing at a constant distance from each other, and the distance might approximately correspond to the length of the sausage casing required for a sausage, but even minor differences between the required length of the sausage casing and the distance of the figurative prints lead to an accumulating error, so that after a few filling operations a figurative print may be located at the point of separation between two sausages.

It is therefore the object underlying the invention to provide a process which allows to produce sausages with a figurative print thereon at a high production rate and with a precise weight.

In accordance with the invention, this object is solved by a process of the above-stated kind, wherein each filled partial length (sausage) is weighed after having been cut off, and the weight difference between a predetermined desired weight and the actual weight of the partial length is determined, and wherein the braking force of the casing brake is increased when the actual weight of the filled partial length is smaller than its desired weight, and is decreased when the actual weight is larger than the desired weight, until the actual weight and the desired weight correspond with each other.

In accordance with the invention, a setting value for the casing brake is for instance formed in dependence on a weight difference, so that the braking force of the casing brake is increased when the actual weight of a weighed sausage lies below the desired value: When the casing brake applies a greater braking force onto the sausage casing, the pressure in the filled partial length of the sausage casing will be increased, whereupon the same will be slightly expanded, and diameter, fullness, volume and thus also the weight of the just produced partial length will be increased. Conversely, the braking force of the casing brake will be decreased, when the measured actual weight of the sausages is larger than their desired weight. Loosening the casing brake will then lead to lighter-weight sausages.

In the present invention, in contrast to conventional processes, the sausage meat is not already portioned before the filling operation, but during the filling operation by dividing off filled partial lengths of the sausage casing in fixed longitudinal intervals—with reference to the sausage casing. In this way, printed sausage casings can advantageously be filled in a continuous production process. At the same time, the process in accordance with the invention provides for a high precision as regards the weight, so that the individual sausages need not be priced individually for sale, but can be provided with a standard price, which already before the filling operation can be printed onto the sausage casing together with a picture, so that the otherwise necessary step of pricing the sausages after the filling operation can be omitted. This leads to a further advantage of the inventive process as regards the productivity.

An advantageous variant of the process consists in that before the filling operation the sausage casing is provided with markers at certain longitudinal intervals, and when the filled part of the sausage casing is moved forward during the filling operation, it is scanned by at least one sensor, which initiates the process of dividing and cutting, as soon as it has detected a marker (DE-PS 36 08 983, DE-GM 94 00 771).

By applying the markers, which initiate the process of dividing and cutting off filled partial lengths of the sausage casing, for instance simultaneously with the figurative print onto the sausage casing, the process of dividing and cutting off can be synchronized particularly easily with the figurative print on the sausage casing, so that every single picture is disposed at a precisely defined position of the completely filled sausage. Markers of any kind can be used, such as mechanical or magnetic markers, but also optical markers, which are for instance part of the figurative print.

For the solution of this object there is also proposed an apparatus of the above-mentioned type, which comprises a balance for individual sausages and an evaluation unit, where the braking force of the casing brake can be set by means of a setting unit, and where the balance is connected with the setting unit via the evaluation unit.

With the apparatus in accordance with the invention, all advantages of the inventive process can be achieved.

An advantageous variant of the apparatus consists in that the apparatus comprises a sensor for detecting markers on the sausage casing.

The invention will now be explained in detail with reference to the FIGURE. The FIGURE shows a schematic representation of a plant for producing sausages in accordance with the invention.

An essential component of the plant is a filling tube 10, whose inlet opening 12 is connected with an outlet of a filling machine not represented in the FIGURE during the operation of the plant. On its outer surface, the filling tube 10 carries a tubular sausage casing 14 upset to form a "caterpillar", whose first end 16 is closed with a clip 18. The second, open end 20 of the sausage casing 14 is located at the end of the caterpillar on the outer surface of the filling tube 10.

In the vicinity of an outlet opening 22 of the filling tube 10 a casing brake 24 is provided, which comprises a braking ring 26 with a conical outer surface, on which a setting ring 28 is arranged so as to be longitudinally movable in the direction of the cone axis. The braking ring 26 is generally made of rubber and with its front inner edge rests on the outside of the sausage casing 14 and urges the same onto the outer surface of the filling tube 10. The setting ring 28 is connected with a setting unit 30 and can be shifted by the same.

Before the filling tube outlet 22 (in the FIGURE on the left beside the filling tube outlet 22) blunt displacement sheets 32a to 32d are provided. Adjacent the displacement sheets, on their side facing away from the filling tube outlet 22, a conveyor belt 34 starts with about the length of one sausage, which is arranged such that it supports the filled part of the sausage casing 14 during the filling operation. Subsequent to the conveyor belt 34 an acceleration conveyor belt 36 is provided, which moves towards a transport belt 48 disposed above a balance 38.

The balance 38 is connected with an evaluation unit 40, which in turn is connected with the setting unit 30 for the casing brake 24. Above the conveyor belt 34 a sensor 42 is mounted such that it can detect markers 44 provided on the sausage casing 14.

For making sausages and sausage casings with a figurative print, the sausage casing 14 is first of all provided with markers 44 and figurative prints. The distance between the markers 44 corresponds to the length of the sausage casing 14, which is required for sausages of the desired weight: Via the density of the sausage meat, weight and volume of the sausage are directly related, so that with a known average diameter of the sausage casing 14 the length required for sausages of a certain weight can be calculated. If it is desired that all sausages have the same weight, the markers on the sausage casing also have a uniform distance from each other. It is, however, also possible to alternatingly produce for instance lighter and shorter as well as heavier and longer sausages, when the distance of the markers 44 on the sausage casing alternates correspondingly.

The printed sausage casing 14 is drawn onto the filling tube 10 such that its first, closed end 16 is disposed at the filling tube outlet 22. Subsequently, the filling of the sausage casing 14 can be started by pressing sausage meat through the filling tube 10 such that it emerges at the filling tube outlet 22 and fills the sausage casing 14 starting at its closed end 16. During the filling operation the sausage casing 14 on the filling tube 10 is tightened, whereby it is braked by the casing brake. The intensity of the braking force determines the fullness of the finished sausage.

Under the pressure of the sausage meat, the filled part of the sausage casing 14 moves forward until the sensor 42 detects the marker 44 on the surface of the sausage casing 14. When the sensor 42 detects the marker 44, the filling operation is interrupted, the displacement sheets 32a to 32d seize and gather the sausage casing 14 at the point of seizure, so that a front, filled partial length of the sausage casing 14 is divided off from the remaining sausage casing 14, but not yet cut off. The two displacement sheets 32a and 32c are then moved in the direction of the longitudinal axis of the sausage until the sausage casing 14 has been gathered between the displacement sheets to a length which is sufficient to subsequently close the sausage casing by setting two adjacent clips 18. Thereupon, the sausage casing 14 is cut through between the two clips 18, so that both the filled partial length now cut off and the end of the unfilled residual length of the sausage casing located near the filling tube outlet 22 are closed. Every filled partial length cut off constitutes a sausage 46.

While the filled part of the sausage casing 14 moves forward after the filling operation, said part is supported by a conveyor belt 34. After having been cut off, each sausage 46 is transferred from the conveyor belt 34 to an acceleration conveyor belt 36, which has a higher transport speed than the conveyor belt 34, so that the sausages 46 get a greater distance from each other. A slower moving transport belt 48 picks up the sausages 46 from the conveyor belt 36 above the balance 38, where the actual weight of each sausage 46 is determined individually. In the evaluation unit 40 the actual weight is then compared with a predetermined desired weight for the sausages, and the difference between the desired weight and the actual weight is calculated. From this difference a setting value for the setting unit 30 of the casing brake 24 is formed.

The setting value is chosen such that the braking force of the casing brake 24 is increased when the actual weight of the sausages is below the desired value: When the casing brake 24 applies a greater braking force onto the sausage casing 14, the pressure in the filled partial length of the sausage casing 14 will be increased, the same will then slightly be expanded, and diameter, fullness, volume and thus also the weight of the partial length just produced will be increased. Conversely, the braking force of the casing brake 24 is decreased, when the measured actual weight of the sausages is larger than their desired weight. Loosening the casing brake will then lead to lighter-weight sausages.

The braking force of the casing brake 24 depends on the force with which the braking ring 26 acts on the outer surface of the sausage casing 14. Said force can be adjusted by moving the setting ring 28 along the longitudinal cone axis of the conical outer surface of the braking ring 26. As a result, the braking ring 26 is pressed onto the sausage casing 14 with more or less intensity. The displacement of the setting ring 28 and thus the setting of the braking force are effected by means of the setting unit 30.

As a result, the process of dividing and cutting off the sausages is synchronized with the length of the sausage casing 14 by means of the markers 44, and a precise weight of the individual sausages is achieved by regulating the fullness of the sausages via an adjustable casing brake. Such process provides for the desired high production rates even with sausages in sausage casings with a figurative print thereon.

We claim:

1. A process of producing sausages, wherein a tubular sausage casing closed at one end and provided with a figurative print is filled with sausage meat by pressing the sausage meat through the open end of the sausage casing into the same, where the sausage casing is carried along against the resistance of a casing brake and, corresponding to markers on the sausage casing, filled partial lengths of the sausage casing are divided off by compressing and closing them and are subsequently cut off from the remaining sausage casing, characterized in that each filled partial length (sausage) is weighed after being cut off, and the weight difference between a predetermined desired weight and the actual weight of the partial length is determined, and that the braking force of the casing brake (24) is increased when the actual weight of the filled partial length is smaller than the desired weight thereof, but is decreased when the actual weight is larger than the desired weight, until the actual weight and the desired weight correspond with each other.

2. The process as claimed in claim 1, characterized in that before the filling operation the sausage casing (14) is provided with markers (44) at certain longitudinal intervals, and when the filled part of the sausage casing (14) is moved forward during the filling operation, the same is scanned by at least one sensor (42), which initiates the process of dividing and cutting as soon as it detects a marker (44).

3. The process as claimed in claim 1, characterized in that a part of the figurative print is used as a marker.

4. An apparatus for the continuous production of sausages having figurative print thereon, and a predetermined desired weight, which comprises a filling tube (10) having an inlet opening (12) connected to a filling machine, and an outlet opening (22), which filling tube, in operation, carries on its outer surface a continuous tubular sausage casing (14) that is drawn off, past the outlet opening, while filling takes place said continuous tubular casing bearing markings (44) which are spaced apart from each other a distance which corresponds to the desired length of sausages to be produced, a casing brake (24) in the vicinity of outlet opening (22) connected to and controlled by a brake setting unit (30), displacement means (32) for seizing and gathering sausage casing following a filled section thereof, means to seal said seized and gathered casing at the open end of a filled section of sausage casing as well as the beginning of the next section of casing to be filled, and means to sever the casing between the two seals, thereby forming a sausage (46), a scale (38) receiving the sausage (46), said scale (38) adapted to determine the weight of the sausage (46), an evaluation unit (40) which compares the actual weight of sausage (46) as determined by scale (38) to a predetermined desired weight, and controls braking unit (24) through brake setting unit (30), so that if the weight of sausage (46) is below the predetermined desired value, the brake force on the casing is increased, and if the weight of sausage (46) is above the predetermined desired amount, the brake force is decreased, a sensor (42) positioned above the casing being filled for detecting said markings (44) provided on sausage casing (14), said sensor being adapted to control means for interrupting the filling of said sausage casing, and activating said displacement means (32) to seal and sever a filled section of said casing from the unfilled remainder of the continuous tubular casing, upon detecting said markings, whereby in operation the braking force of brake (24) upon said casing is adjusted in accordance with relationship of the actual weight of sausage (36) to the predetermined desired weight, until the actual weight and the desired weight correspond with each other while at the same time the sensor (42) controls the displacement means to maintain the length of the sausages in accordance with the distance between the markers on the sausage casing.

5. The apparatus of claim 4 further comprising a first conveyor belt (34) for receiving the sausage (46) and conveying it away from said filling tube (10), a second conveyor belt (36) having a higher transport speed than said first conveyor belt and positioned to receive said sausage (46) from said first conveyor belt (34), and a third conveyor belt (48) which receives sausage (46) from said second conveyor belt (36) and is mounted on scale (38).

* * * * *